UNITED STATES PATENT OFFICE.

A. G. HUNTER, OF FLINT, WALES.

IMPROVEMENT IN THE MANUFACTURE OF CARBONATES OF SODA AND POTASH.

Specification forming part of Letters Patent No. 77,381, dated April 28, 1868.

*To all whom it may concern:*

Be it known that I, A. G. HUNTER, of Flint, Wales, temporarily residing in Fair Haven, in the county of New Haven and State of Connecticut, have invented a new Improvement in the Manufacture of Soda and Potash; and I do hereby declare the following to be a full, clear, and exact description of the same.

The object of this invention is to effect the conversion of sulphate of soda or sulphate of potash into the corresponding carbonated alkali by means of bicarbonate of lime—that is, carbonate of lime dissolved by an excess of carbonic acid. I effect this by mixing the alkali sulphate to be treated with a solution of bicarbonate of lime, whereby sulphate of lime and alkaline bicarbonate are produced. This double decomposition is most conveniently effected at ordinary temperatures, and is facilitated when performed in contact with carbonic acid. The solution of bicarbonate of lime may be produced by acting on lime or carbonate of lime suspended in water by carbonic acid.

Several forms of apparatus may be employed to carry out this invention. Among others I may mention—

First. Open tanks or vessels provided with agitators to effect this suspension in water of the lime or carbonate of lime while being dissolved by carbonic acid injected into the liquid, and to effect a thorough mixture of the alkaline sulphate to be treated (which may be added either as a solid or liquid) with the solution of bicarbonate of lime, and subsequently, when the precipitated sulphate of lime has settled and the solution of alkaline carbonate been run off therefrom, to wash the said sulphate of lime free from adhering alkaline salts. The carbonic acid may be derived from several sources, among others from burning coal, or from a limekiln, and may be injected into the liquid after being cooled by means of an air-pump.

Second. Closed tanks or vessels capable of standing pressure, and provided with agitators and suitable inlets and outlets, in which the solution of bicarbonate of lime may be prepared under pressure, and the decomposition of the alkaline sulphate to be treated also effected under pressure produced by injection of carbonic acid. In using such apparatus the alkaline sulphate may be pumped in as a solution, or it may be placed in the apparatus in a solid or liquid form at the same time as the lime or carbonate of lime and water is, and the whole agitated together, with injection of carbonic acid, till it is found by testing a sample obtained by a gage-cock that the alkaline sulphate is converted into carbonate. When this point is reached the injection of carbonic acid and the agitator are stopped to allow the sulphate of lime to settle, and the solution of alkaline carbonate is subsequently run off and the residuary sulphate of lime washed with water to free it of alkaline salts. By this form of apparatus more concentrated solutions may be obtained than in open tanks, and the greater the pressure the more concentrated solution may be obtained.

The sulphate of lime may be used for any of the purposes to which that substance is applied; and the carbonated alkali solutions obtained may either be used as such, or by concentration at a low temperature, or *in vacuo*, may be obtained as bicarbonates, or by concentration may be obtained as crystallized carbonated alkali, or by evaporation to dryness as dry carbonated alkali, or if causticized by lime may be obtained as caustic alkali. The respective modes of such concentration, evaporation, or causticizing are well known to practical chemists, and need no description here.

The respective quantities of bicarbonate of lime and of the alkaline sulphate to be treated are determined by their equivalents, which are well known to practical chemists.

Having thus fully described my invention, what I claim as new and useful, and desire to secure by Letters Patent, is—

The process of converting sulphate of soda or sulphate of potash into the corresponding carbonate by double decomposition with bicarbonate of lime, substantially as described herein.

A. G. HUNTER.

Witnesses:
JOHN E. EARLE;
A. J. TIBBITS.